United States Patent
Ito et al.

(10) Patent No.: US 10,539,666 B2
(45) Date of Patent: Jan. 21, 2020

(54) LASER RADAR DEVICE

(71) Applicant: Mitsubishi Electric Corporation, Tokyo (JP)

(72) Inventors: Yusuke Ito, Tokyo (JP); Masaharu Imaki, Tokyo (JP); Shumpei Kameyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 323 days.

(21) Appl. No.: 15/526,659

(22) PCT Filed: Aug. 31, 2015

(86) PCT No.: PCT/JP2015/074710
§ 371 (c)(1),
(2) Date: May 12, 2017

(87) PCT Pub. No.: WO2016/117159
PCT Pub. Date: Jul. 28, 2016

(65) Prior Publication Data
US 2017/0336499 A1    Nov. 23, 2017

(30) Foreign Application Priority Data

Jan. 21, 2015 (JP) ................. 2015-009417

(51) Int. Cl.
*G01C 3/08*    (2006.01)
*G01S 7/497*    (2006.01)
(Continued)

(52) U.S. Cl.
CPC .......... *G01S 7/4972* (2013.01); *G01S 7/4817* (2013.01); *G01S 17/58* (2013.01); *G01S 17/95* (2013.01)

(58) Field of Classification Search
None
See application file for complete search history.

(56) References Cited

U.S. PATENT DOCUMENTS 4,118,109 A * 10/1978 Crawford ........... G02B 26/0883
359/196.1
4,311,385 A    1/1982 Keene
(Continued)

FOREIGN PATENT DOCUMENTS

EP    2065724 A2    6/2009
JP    H04-352124 A    12/1992
(Continued)

OTHER PUBLICATIONS

JP Office Action dated May 24, 2016, from corresponding JP Appl No. 2016-512719, with English translation, 5 pp.
(Continued)

*Primary Examiner* — Isam A Alsomiri
*Assistant Examiner* — Amir J Askarian
(74) *Attorney, Agent, or Firm* — Studebaker & Brackett PC

(57) ABSTRACT

A device includes a light source (1) for generating light with a single wavelength; a modulator (3) for modulating the light generated into transmission light; a beam scanner (7) for carrying out beam scanning by which the transmission light modulated is radiated, and the light reflected is received; a beam scanning controller (8) for controlling the radiation direction; a signal processing unit (12) for performing wind measurement through heterodyne detection using the light generated and the corresponding received light; and an optical axis corrector (9) for correcting the optical axis angular shift between the transmission light and the received light, which accompanies the beam scanning, with respect to the received light used by the signal processing unit (12) or the transmission light used by the beam scanner (7), on the basis of the radiation direction of the beam scanner (7), the angular speed of the beam scanning and the wind measurement distance.

3 Claims, 8 Drawing Sheets

(51) Int. Cl.
*G01S 17/95* (2006.01)
*G01S 7/481* (2006.01)
*G01S 17/58* (2006.01)

(56) References Cited

U.S. PATENT DOCUMENTS

| | | | | |
|---|---|---|---|---|
| 5,249,157 | A | 9/1993 | Taylor | |
| 6,014,205 | A * | 1/2000 | Kanazawa | G02B 26/127 356/73 |
| 6,147,747 | A | 11/2000 | Kavaya et al. | |
| 7,576,308 | B1 * | 8/2009 | Gruneisen | G02B 26/0825 250/201.9 |
| 7,813,644 | B2 * | 10/2010 | Chen | G01S 7/4812 244/3.1 |
| 8,982,210 | B2 * | 3/2015 | Fry | F41G 7/008 348/148 |
| 9,075,239 | B2 * | 7/2015 | Kim | G02B 17/023 |
| 9,170,162 | B2 * | 10/2015 | Hutchin | G01J 1/4257 |
| 2004/0114152 | A1 * | 6/2004 | Hill | G03F 7/70716 356/498 |
| 2004/0240088 | A1 * | 12/2004 | Prince | G02B 7/1805 359/831 |
| 2010/0027089 | A1 * | 2/2010 | Nilsson | G01S 7/4817 359/201.1 |
| 2011/0128162 | A1 | 6/2011 | Klepsvik | |
| 2013/0314694 | A1 * | 11/2013 | Tchoryk, Jr. | G01S 17/95 356/28.5 |
| 2015/0146191 | A1 | 5/2015 | Kotake et al. | |

FOREIGN PATENT DOCUMENTS

| | | |
|---|---|---|
| JP | H06-012598 A | 1/1994 |
| JP | 2000-046930 A | 2/2000 |
| JP | 2001-066138 A | 3/2001 |
| JP | 2002-174684 A | 6/2002 |
| JP | 2004-286574 A | 10/2004 |
| JP | 2007-316016 A | 12/2007 |
| JP | 2011-530712 A | 12/2011 |
| JP | 2012-021878 A | 2/2012 |
| JP | 2013-130531 A | 7/2013 |
| WO | 2004/099849 A1 | 11/2004 |
| WO | 2014/024508 A1 | 2/2014 |

OTHER PUBLICATIONS

Lawrence T. et al.; "Design Concept for a Global Wind Sensing Lidar"; IEEE Journal of Quantum Electronics; Sep. 1, 1979; pp. 964-965; vol. 15; No. 9; IEEE Service Center, Piscataway, NJ, USA.
AZoOptics; "Risley Prisms—Definition and Uses"; May 6, 2014; URL: <https://www.azooptics.com/Article.aspx?ArticleID=715>.
Craig Schwarze et al.; "A New Look at Risley Prisms"; Photonics Spectra; Jun. 2006; URL: <https://www.photonics.com/Article.aspx?AID=25652>.
The extended European search report issued by the European Patent Office dated Aug. 30, 2018 which corresponds to European Patent Application No. 15878848.9 and is related to U.S. Appl. No. 15/526,659.
International Search Report issued in PCT/JP2015/074710; dated Dec. 1, 2015.

* cited by examiner

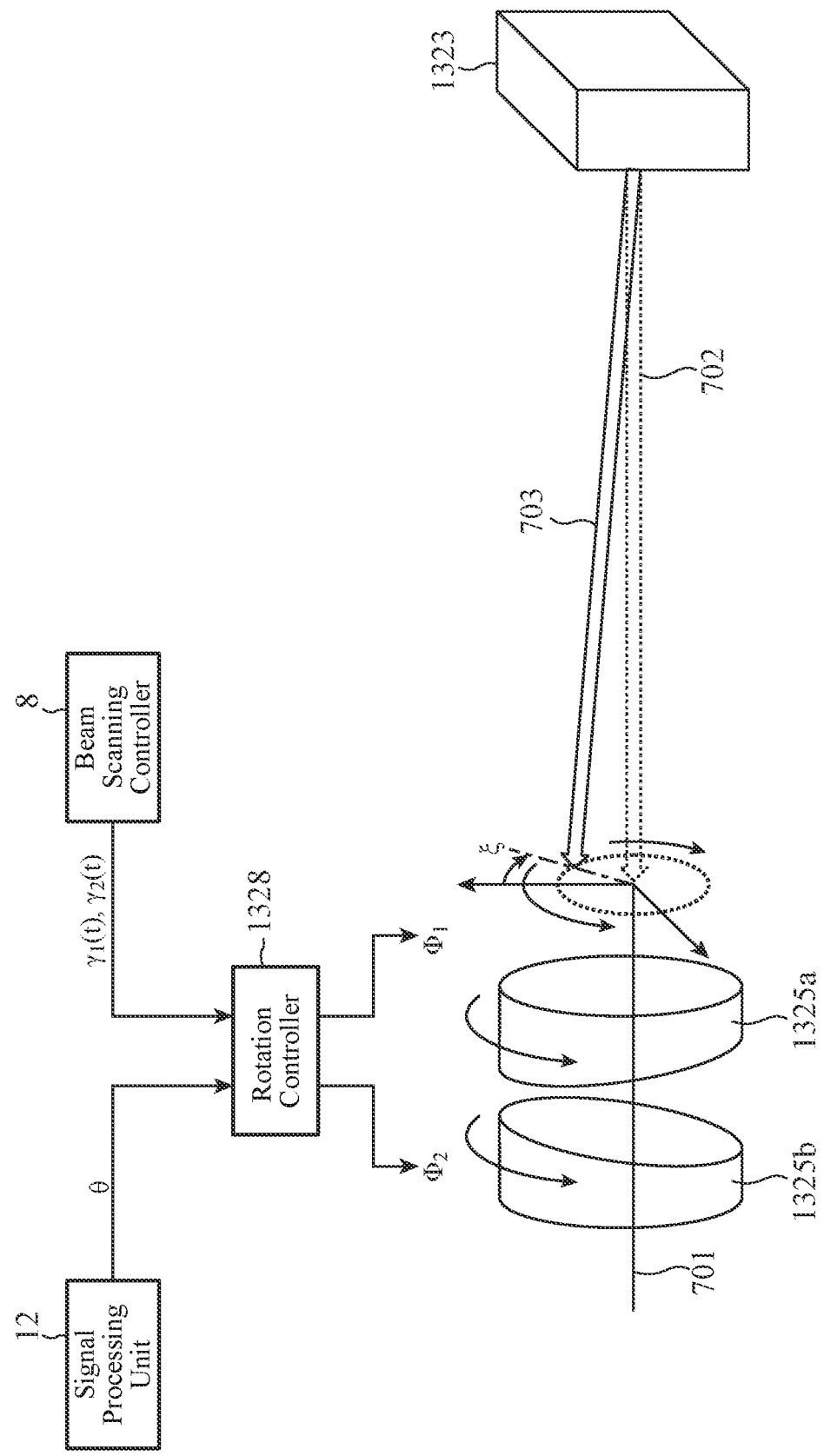

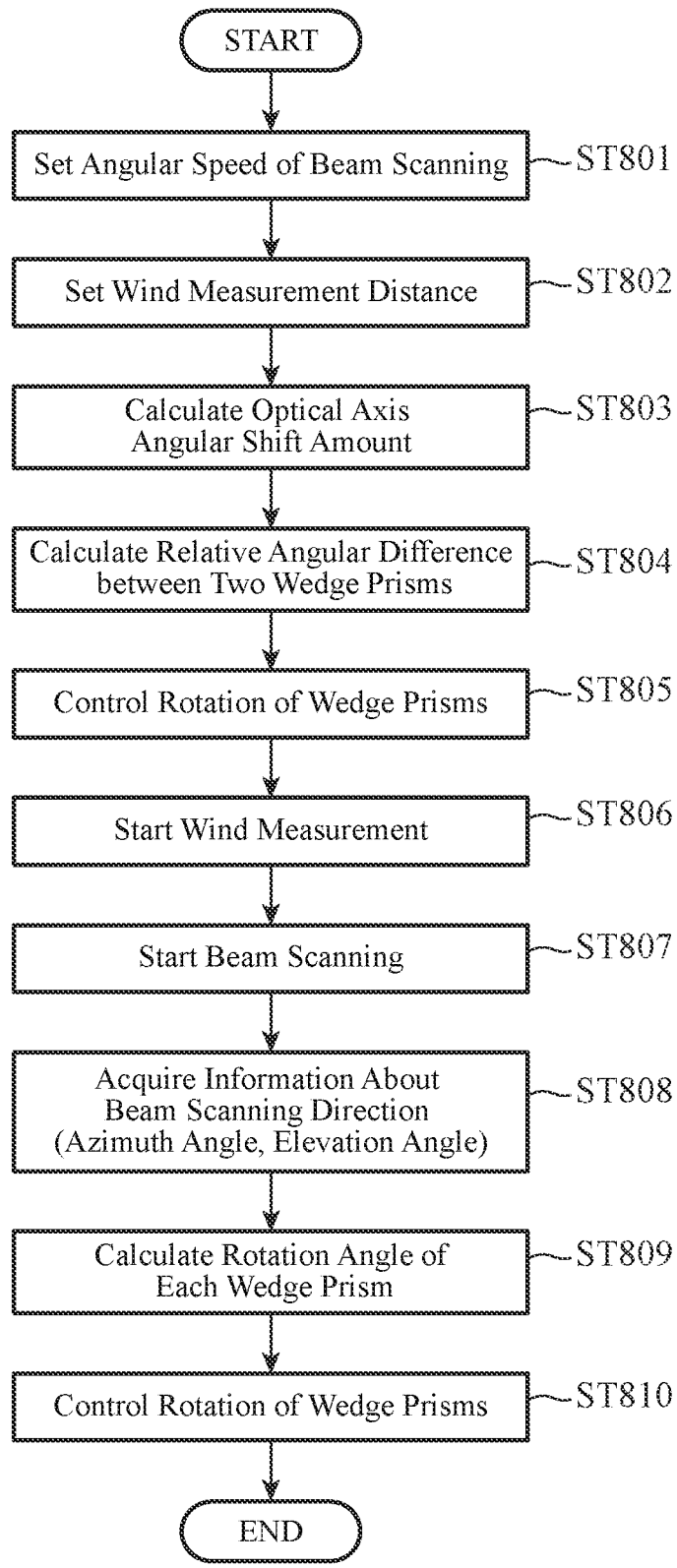

LASER RADAR DEVICE

TECHNICAL FIELD

The present invention relates to a laser radar device for carrying out wind measurement.

BACKGROUND ART

As for wind measurement with a laser radar device, the laser radar device radiates laser pulse light into the atmosphere as transmission light and receives scattered light (reflected light) by aerosols as received light. Then, the laser radar device obtains a Doppler shift caused by the movement of the aerosols through heterodyne detection between the received light and the local light of the transmission light, which is continuous light with a single wavelength, and measures a wind speed in the radiation direction. The Doppler shift is calculated from a spectrum obtained by a Fourier transform of the signal after the heterodyne detection. In addition, the wind measurement direction is changed by switching the radiation direction of the transmission light (for example, see Patent Document 1).

CITATION LIST

Patent Literature

Patent Document 1: Japanese Patent Laid-Open No. 2000-046930.

SUMMARY OF INVENTION

Technical Problem

Here, to increase a wind measurement rate in the laser radar device, it is necessary to speed up the beam scanning. On the other hand, owing to the beam scanning, an optical axis angular shift occurs between the transmission light and the received light. In addition, the optical axis angular shift between the transmission light and the received light increases as the beam scanning becomes faster and the received light comes from a greater distance. Incidentally, when the beam scanning is not carried out, the optical axis angular shift between the transmitted and the received light beams is reduced to zero. In this case, however, the wind measurement direction is limited to only one direction.

The foregoing optical axis angular shift leads to a reduction in coupling efficiency with the received light. This presents problems in that the received signal intensity is reduced, and the speedup of the beam scanning (that is, an increase in the wind measurement rate) leads to a decrease of a wind measurable distance.

The present invention is implemented to solve the foregoing problems. Therefore, it is an object of the present invention to provide a laser radar device that can correct an optical axis angular shift between the transmission light beam and the received light beam due to the beam scanning and carry out the wind measurement without reducing the intensity of the received signal.

Solution to Problem

A laser radar device according to the present invention includes: a light source to generate light with a single wavelength; a modulator to modulate the light generated by the light source into transmission light; a beam scanner to carry out beam scanning by which the transmission light modulated by the modulator is radiated, and the light reflected is received as received light; a beam scanning controller to correct a radiation direction of the beam scanner; a signal processor to carry out wind measurement by performing heterodyne detection by using the light generated by the light source and the corresponding received light received by the beam scanner; and an optical axis corrector to successively correct an optical axis angular shift occurring between the transmission light and the received light which vary with time owing to the beam scanning, with respect to the received light used by the signal processor or the transmission light used by the beam scanner, on a basis of information indicating the radiation direction of the transmission light in the beam scanner, the information being successively received from the beam scanning controller, and on a basis of an angular speed of the beam scanning and a wind measurement distance, wherein the optical axis corrector comprises: two wedge prisms with their flat faces being disposed perpendicularly to a reference optical axis; and a rotation controller to correct the optical axis angular shift by carrying out simultaneous rotation control of the two wedge prisms in a manner as to follow change of the information indicating the radiation direction of the transmission light from the beam scanner, the information being successively received from the beam scanning controller, in a state in which the two wedge prisms are provided with a relative angular difference and the angular difference is being maintained, on the basis of the angular speed of the beam scanning and a specified wind measurement distance used for correcting the optical axis angular shift.

Advantageous Effects of Invention

According to the present invention, the laser radar device with the foregoing configuration can correct the optical axis angular shift between transmitted and received light beams due to the beam scanning, thereby being able to carry out the wind measurement without reducing the received signal intensity.

BRIEF DESCRIPTION OF DRAWINGS

FIG. 7 is a block diagram illustrating an optical axis correction function of the beam scanning optical system of the embodiment 2 in accordance with the present invention; and FIG. 8 is a flowchart showing the general operation of the laser radar device of the embodiment 2 in accordance with the present invention.

DESCRIPTION OF EMBODIMENTS

The best mode for carrying out the invention will now be described with reference to the accompanying drawings.

Embodiment 1

Figure 1:
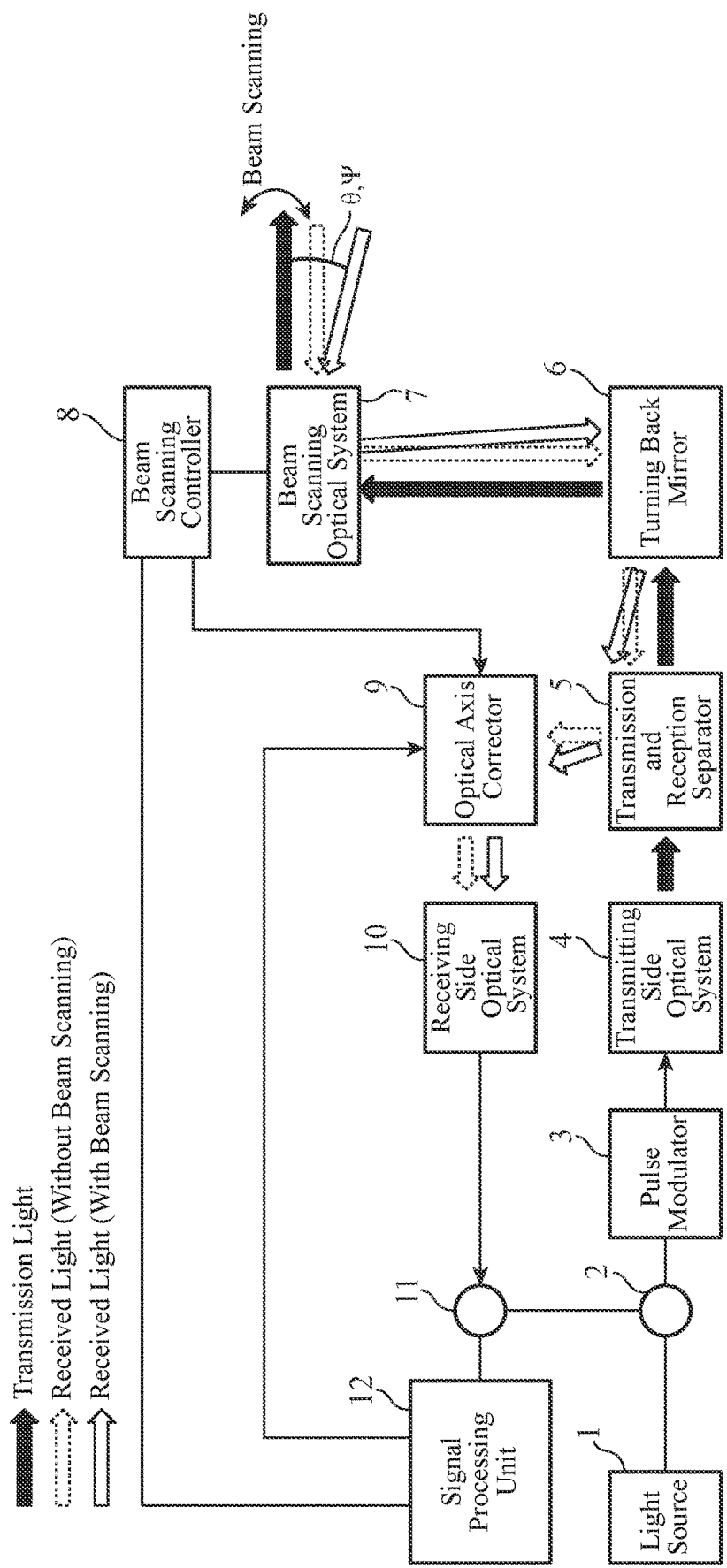
FIG. 1 is a block diagram showing a configuration of a laser radar device of an embodiment 1 in accordance with the present invention.

FIG. 1 is a block diagram showing a configuration of a laser radar device of an embodiment 1 in accordance with the present invention.

As shown in FIG. 1, the laser radar device is comprised of a light source 1, an optical splitter 2, a pulse modulator (modulator) 3, a transmitting side optical system 4, a transmission and reception separator 5, a turning back mirror 6, a beam scanning optical system (beam scanner) 7, a beam scanning controller 8, an optical axis corrector 9, a receiving side optical system 10, an optical coupler 11, and a signal processing unit 12.

The light source 1 has a function of generating light (continuous light) with a single wavelength in a wavelength band capable of being scattered (reflected) by aerosols in the atmosphere. The light generated by the light source 1 is output to the optical splitter 2.

The optical splitter 2 has a function of dividing the light from the light source 1 into two parts. A first part divided by the optical splitter 2 is output to the pulse modulator 3, and a second part is output to the optical coupler 11.

The pulse modulator 3 has a function of carrying out modulation (pulse modulation) of the light from the optical splitter 2 and a function of providing a desired frequency shift. The light modulated by the pulse modulator 3 is output to the transmitting side optical system 4 as the transmission light.

The transmitting side optical system 4 has a function of shaping the transmission light from the pulse modulator 3 into light with a desired beam diameter and a desired angle of divergence. The transmission light shaped by the transmitting side optical system 4 is output to the transmission and reception separator 5.

The transmission and reception separator 5 has a function of switching an output destination in response to light to be imputted. Here, when the transmission light from the transmitting side optical system 4 is input, the transmission and reception separator 5 outputs the transmission light to the turning back mirror 6. In contrast, when the received light from the turning back mirror 6 is input, the transmission and reception separator 5 outputs the received light to the optical axis corrector 9. The transmission and reception separator 5 is set up on the optical axis of the transmission light.

The turning back mirror 6 has a function of sending the transmission light from the transmission and reception separator 5 to the beam scanning optical system 7, and a function of sending the received light from the beam scanning optical system 7 to the transmission and reception separator 5. The turning back mirror 6 may be comprised of a single mirror or a plurality of mirrors. The turning back mirror 6 is set up on the optical axis of the transmission light.

The beam scanning optical system 7 has a function of emitting the transmission light from the turning back mirror 6 to the atmosphere and receiving the light scattered (reflected) by the aerosols as the received light, and a function of changing the radiation direction of the transmission light so as to enable the beam scanning. The beam scanning optical system 7 is set up on the optical axis of the transmission light. A configuration of the beam scanning optical system 7 will be described later.

The beam scanning controller 8 has a function of controlling the radiation direction of the beam scanning optical system 7 in accordance with information from the signal processing unit 12 (information indicating a beam scanning angular speed and a beam scanning method). More specifically, the beam scanning controller 8 controls the rotation angles of an azimuth alteration mirror 71 and an elevation angle alteration mirror 72 of the beam scanning optical system 7, which will be described later. Thus, the beam scanning controller 8 controls the radiation direction (azimuth and elevation angles) of the transmission light. In addition, the beam scanning controller 8 has a function of sending control information (information indicating the radiation direction of the transmission light) of the beam scanning optical system 7 to the optical axis corrector 9 and the signal processing unit 12. The beam scanning controller 8 is implemented by program processing based on software with a CPU.

The optical axis corrector 9 has a function of correcting the optical axis angular shift occurring between the transmission light and the received light owing to the beam scanning with respect to the received light from the transmission and reception separator 5 on the basis of the control information from the beam scanning controller 8 (information indicating the radiation direction of the transmission light) and information from the signal processing unit 12 (information indicating an optical axis angular shift amount obtained from the beam scanning angular speed and wind measurement distance). The optical axis corrector 9 is set up on the optical axis of the received light (received light in a state in which the beam scanning is not carried out) serving as a reference. A configuration of the optical axis corrector 9 will be described later. The received light corrected by the optical axis corrector 9 is output to the receiving side optical system 10.

The receiving side optical system 10 has a function of shaping the received light from the optical axis corrector 9 into light with a desired beam diameter and a desired angle of divergence. The receiving side optical system 10 is set up on the optical axis of the received light serving as a reference. The received light shaped by the receiving side optical system 10 is output to the optical coupler 11.

The optical coupler 11 has a function of coupling the light (continuous light) from the optical splitter 2 with the corresponding received light from the receiving side optical system 10. The light coupled through the optical coupler 11 is output to the signal processing unit 12.

The signal processing unit 12 has a function of calculating a frequency shift by carrying out the heterodyne detection with respect to the light from the optical coupler 11, and a function of calculating, on the basis of the control information from the beam scanning controller 8, a wind speed from the frequency shift calculated. In addition, the signal processing unit 12 has a function of setting the beam scanning angular speed and the beam scanning method, and sending the setting information to the beam scanning controller 8. Furthermore, the signal processing unit 12 also has a function of calculating the optical axis angular shift amount from the beam scanning angular speed and wind measurement distance and sending the information indicating optical axis angular shift amount to the optical axis corrector 9. The signal processing unit 12 is implemented by program processing based on software with a CPU.

Next, a configuration of the beam scanning optical system 7 will be described with reference to FIG. 2.

Figure 2:
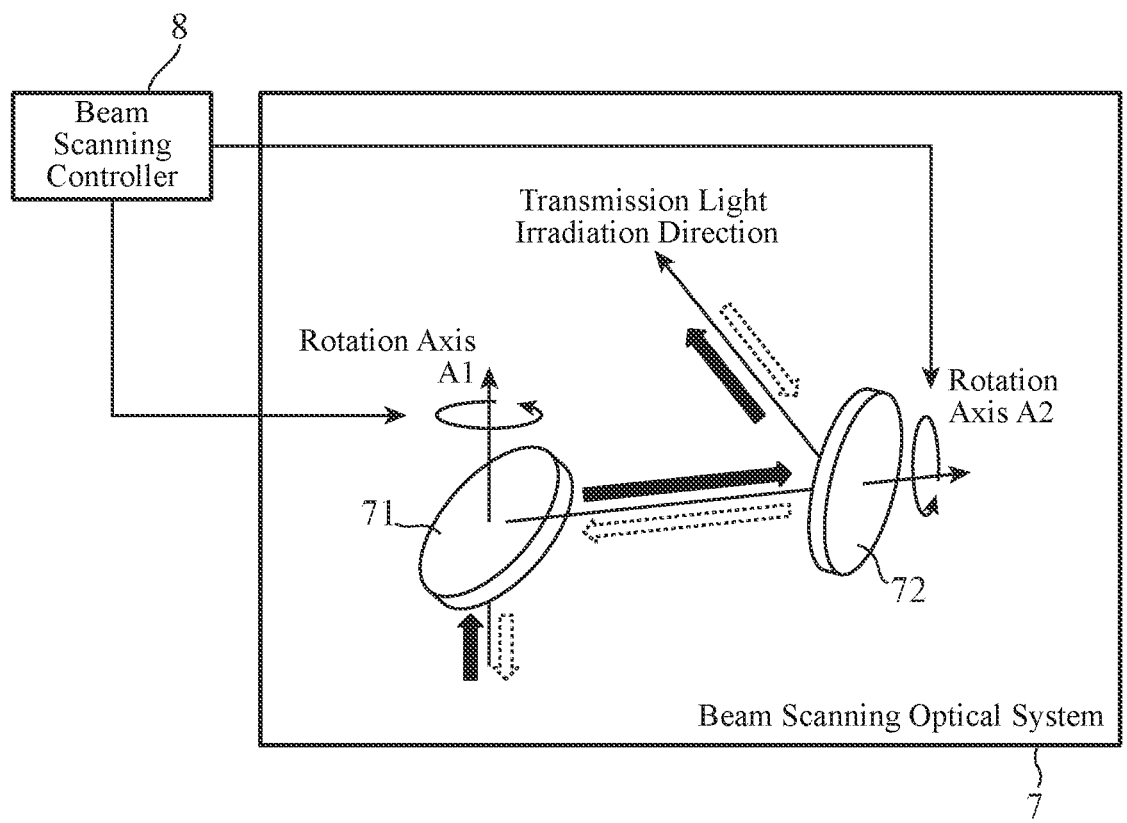
FIG. 2 is a diagram showing a configuration of a beam scanning optical system of the embodiment 1 in accordance with the present invention.

As shown in FIG. 2, the beam scanning optical system 7 is comprised of the azimuth alteration mirror 71 and the elevation angle alteration mirror 72.

The azimuth alteration mirror 71 has a function of altering the azimuth of the radiation direction of the transmission light. More specifically, the azimuth alteration mirror 71 has an independent rotation axis A1 and alters the azimuth by rotating about the rotation axis A1 in accordance with the control by the beam scanning controller 8. The azimuth alteration mirror 71 is set up on the optical axis of the transmission light.

The elevation angle alteration mirror 72 has a function of altering the elevation angle of the radiation direction of the transmission light. More specifically, the elevation angle alteration mirror 72 has an independent rotation axis A2 and alters the elevation angle by rotating about the rotation axis A2 in accordance with the control by the beam scanning controller 8. Incidentally, the elevation angle alteration mirror 72 rotates about the rotation axis A2 along with the rotation of the azimuth alteration mirror 71. The elevation angle alteration mirror 72 is set up on the optical axis of the transmission light.

Then, for example, by rotating the azimuth alteration mirror 71 about the rotation axis A1 in a state in which the angle of the elevation angle alteration mirror 72 is fixed, the radiation direction of the transmission light can be changed in a range from zero degrees to 360 degrees in the azimuth direction. Incidentally, while the azimuth alteration mirror 71 rotates about the rotation axis A1, the elevation angle alteration mirror 72 is fixed to the same rotation coordinate system. At this time, the elevation angle of the radiation direction of the transmission light is determined by the angle of the elevation angle alteration mirror 72.

In addition, the azimuth alteration mirror 71 and the elevation angle alteration mirror 72 also have a function of receiving the scattered light of the emitted transmission light, which is dispersed by scattering bodies in the atmosphere as the received light, and leading the received light to the turning back mirror 6.

Next, a configuration of the optical axis corrector 9 will be described with reference to FIG. 3.

Figure 3:
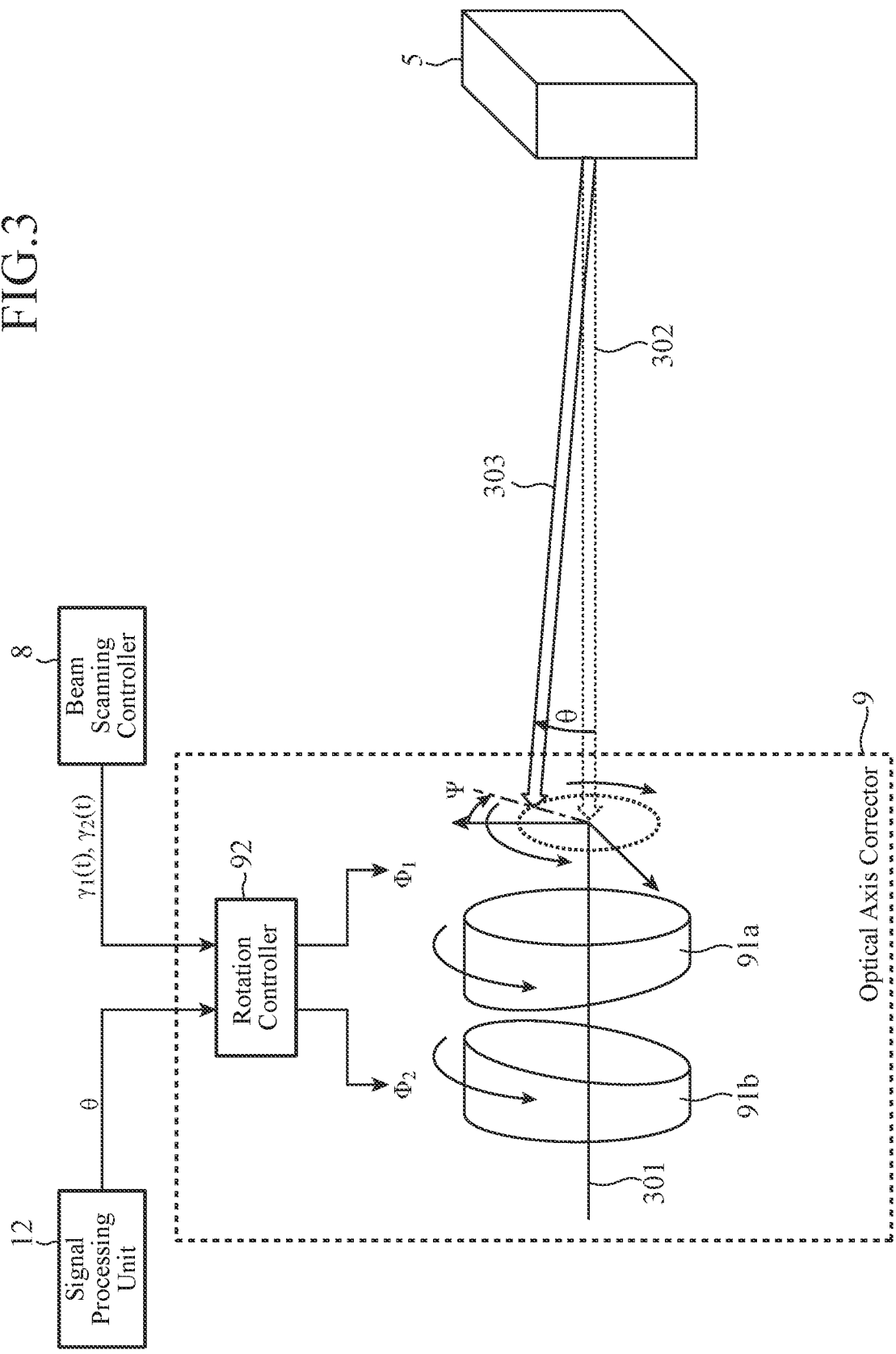
FIG. 3 is a block diagram showing a configuration of an optical axis corrector of the embodiment 1 in accordance with the present invention.

As shown in FIG. 3, the optical axis corrector 9 is comprised of two wedge prisms 91a and 91b and a rotation controller 92.

As for the received light from the transmission and reception separator 5, the wedge prisms 91a and 91b have a function of correcting the optical axis angular shift occurring between the transmission light beam and the received light beam owing to the beam scanning. The wedge prisms 91a and 91b are set up in such a manner that their flat faces are perpendicular (including approximately perpendicular) to the optical axis of the received light serving as a reference and that their two flat faces are parallel (including approximately parallel) to each other.

The rotation controller 92 has a function of calculating the rotation angles of the wedge prisms 91a and 91b on the basis of the control information from the beam scanning controller 8 (information indicating the radiation direction of the transmission light) and the information from the signal processing unit 12 (information indicating an optical axis angular shift amount), and a function of carrying out the rotation control of the wedge prism 91a and the wedge prism 91b independently in accordance with the rotation angles calculated. The rotation controller 92 is implemented by program processing based on software with a CPU.

Next, the operation of the optical axis corrector 9 will be described with reference to FIG. 3.

FIG. 3 describes how the received light causes an optical axis angular shift owing to the beam scanning (changes in the radiation direction of the transmission light) with respect to the optical axis of the received light 301 serving as a reference.

As shown in FIG. 3, upon the implementation of the beam scanning, the angle of the received light sent to the receiving side optical system 10 is shifted from the optical axis 301 by an optical axis angular shift amount θ.

Furthermore, the traveling direction of the received light alters, along with the beam scanning. In FIG. 3, the traveling direction of the received light serving as a reference is illustrated by an arrow 302, and the traveling direction of the received light due to the beam scanning is illustrated by an arrow 303. For example, when the radiation direction of the transmission light is rotated from zero degrees to 360 degrees at a uniform velocity with respect to the azimuth owing to the beam scanning, the optical axis shift direction of the received light rotates about the optical axis 301 in a state in which the optical axis angular shift amount θ is held at a fixed value. In FIG. 3, the optical axis shift direction of the received light about the optical axis 301 is denoted by a variable ψ.

Then, the wedge prisms 91a and 91b correct the optical axis angular shift of the received light, which depends on the two angles θ and ψ.

As described above, the optical axis shift direction ψ of the received light continuously alters during the beam scanning. Accordingly, it is necessary for the optical axis corrector 9 to correct the optical axis shift while always receiving the control information (information indicating the radiation direction of the transmission light) from the beam scanning controller 8. The following description will be made quantitatively as to the optical axis angular shift amount θ and the optical axis shift direction ψ.

First, the signal processing unit 12 sends the information indicating the optical axis angular shift amount θ to the optical axis corrector 9.

Incidentally, the optical axis angular shift amount θ can be obtained from a beam scanning angular speed ω, a wind measurement distance L for correcting the optical axis angular shift amount between the transmission light beam and the received light beam, and a speed of light c according to the following Expression (1):

$$\theta = \frac{2\omega L}{c} \quad (1)$$

After that, the optical axis corrector 9 successively receives the control information (rotation angles $\gamma_1$ (t) and $\gamma_2$ (t) of the mirrors 71 and 72) from the beam scanning controller 8. Here, t is a variable of time, and $\gamma_1$ (t) and $\gamma_2$ (t) represent that the rotation angles of the mirrors 71 and 72 alter with a lapse of time. Incidentally, the radiation direction of the transmission light is determined uniquely by the rotation angles $\gamma_1$ (t) and $\gamma_2$ (t).

After that, on the basis of the optical axis angular shift amount θ and the rotation angles $\gamma_1$ (t) and $\gamma_2$ (t) of the mirrors 71 and 72, the optical axis corrector 9 determines the rotation angles $\Phi_1$ and $\Phi_2$ of the wedge prisms 91a and 91b.

Here, the rotation angles $\Phi_1$ and $\Phi_2$ of the wedge prisms 91a and 91b can be obtained according to the following Expressions (2)-(4):

$$\Phi_1=\Phi_2+\sigma \quad (2)$$

$$\Phi_2=\tan^{-1}(\tan\psi(\cos\sigma+1)-\sin\sigma)/(\cos\sigma+1+\sin\sigma\tan\psi) \quad (3)$$

$$\sigma=\cos^{-1}(\theta^2-2\delta^2)/2\delta^2 \quad (4)$$

Incidentally, $\delta$ is obtained from refractive indices n of the wedge prisms 91a and 91b and inclination angles $\alpha$ of the wedge prisms 91a and 91b according to the following Expression (5), and represents an angle with which the light beam incident on the single wedge prism 91 is refracted.

$$\delta=(n-1)\alpha \quad (5)$$

Incidentally, it is assumed in Expressions (2)-(4) that the refractive indices of the wedge prisms 91a and 91b are equal.

The optical axis shift direction $\psi$ is a variable determined by the rotation angles $\gamma_1$ (t) and $\gamma_2$ (t) of the mirrors 71 and 72 and the direction cosine $\beta$ of the reflection plane of the turning back mirror 6, and represents the optical axis shift direction of the received light incident on the wedge prisms 91a and 91b of the optical axis corrector 9 from the transmission and reception separator 5.

The optical axis shift direction $\psi$ is obtained by the following Expression (6):

$$\psi=\psi(\gamma_1(t),\gamma_2(t),\beta) \quad (6)$$

Thus, the optical axis corrector 9 calculates the optical axis shift direction $\psi$ and then calculates the rotation angles $\Phi_1$ and $\Phi_2$ of the wedge prisms 91a and 91b. Then, on the basis of the results, the optical axis corrector 9 carries out the rotation control of the wedge prisms 91a and 91b.

Next, the overall operation of the laser radar device with the foregoing configuration will be described with reference to FIG. 4.

Figure 4:
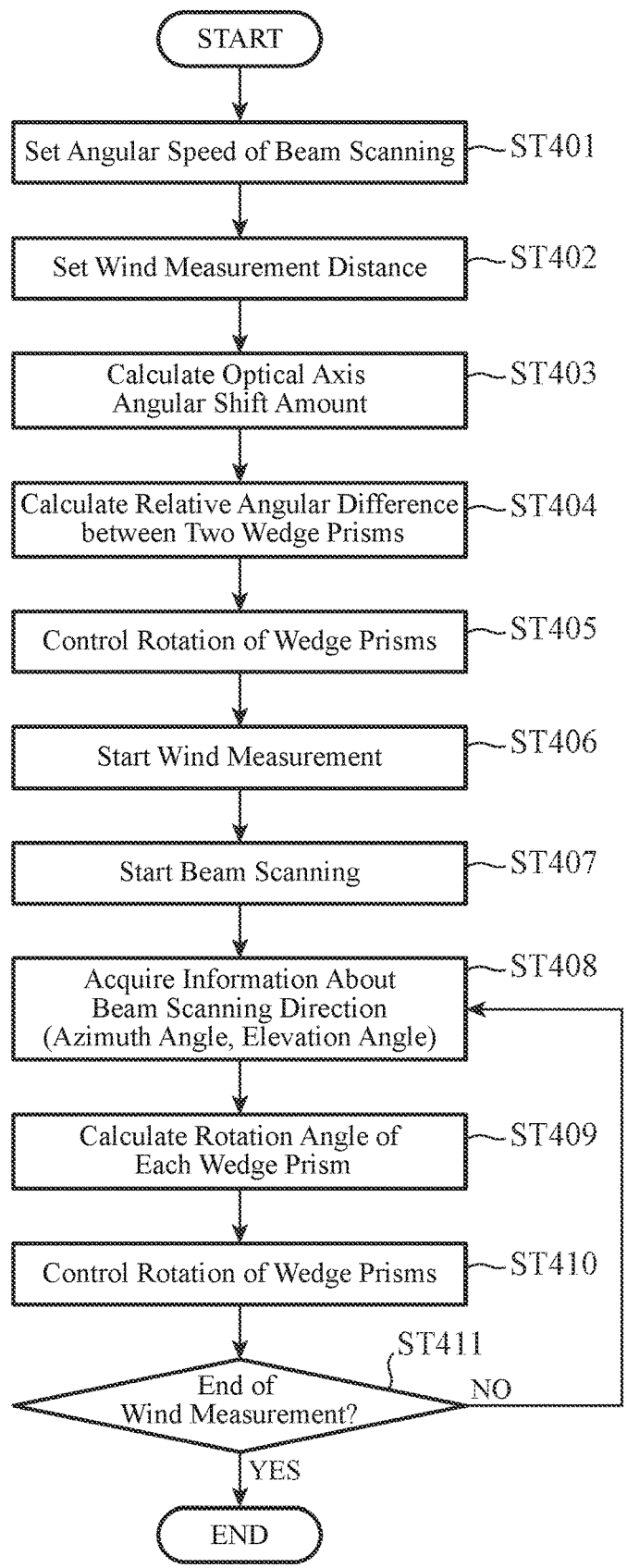
FIG. 4 is a flowchart showing the general operation of the laser radar device of the embodiment 1 in accordance with the present invention.

In the overall operation of the laser radar device, before starting the beam scanning, as shown in FIG. 4, the signal processing unit 12 sets the beam scanning angular speed $\omega$, and the wind measurement distance L for correcting the optical axis angular shift between the transmission light beam and the received light beam (steps ST401 and ST402). Then, the signal processing unit 12 calculates the optical axis angular shift amount $\theta$ from the beam scanning angular speed $\omega$ and the wind measurement distance L (step ST403). The information indicating the optical axis angular shift amount $\theta$ is sent to the optical axis corrector 9. Incidentally, it may be configured such that the signal processing unit 12 sets the beam scanning angle $\omega$ and the wind measurement distance L, and the rotation controller 92 of the optical axis corrector 9 calculates the optical axis angular shift amount $\theta$.

Furthermore, the signal processing unit 12 sends the information indicating the beam scanning angular speed $\omega$ and the beam scanning method (rotation control method of the mirrors 71 and 72) to the beam scanning controller 8.

After that, the rotation controller 92 of the optical axis corrector 9 calculates a relative angular difference between the wedge prisms 91a and 91b according to Expressions (2), (4) and (5) on the basis of the information from the signal processing unit 12 (information indicating the optical axis angular shift amount $\theta$) (step ST404). Then, on the basis of the calculation result, the rotation controller 92 provides the wedge prisms 91a and 91b with the relative angular difference (step ST405). This makes it possible to correct the optical axis angular shift amount $\theta$. Incidentally, in the process of the beam scanning, as long as the beam scanning angular speed $\omega$ and the wind measurement distance L for correcting the optical axis angular shift between the transmission light beam and the received light beam are fixed, the angular difference is also fixed continually.

After that, the wind measurement is started (step ST406). More specifically, the light source 1 generates the light (continuous light) with a single wavelength, and the optical splitter 2 divides the light into two parts. A first part divided by the optical splitter 2 is output to the pulse modulator 3, and a second part is output to the optical coupler 11.

Next, the pulse modulator 3 carries out the pulse modulation of the light sent from the optical splitter 2 and gives a desired frequency shift to the light. The light modulated by the pulse modulator 3 is output to the transmitting side optical system 4 as the transmission light.

Next, the transmitting side optical system 4 shapes the transmission light from the pulse modulator 3 into light with a desired beam diameter and a desired angle of divergence. The transmission light shaped by the transmitting side optical system 4 is output to the beam scanning optical system 7 via the transmission and reception separator 5 and the turning back mirror 6.

After that, the beam scanning controller 8 controls the radiation direction of the beam scanning optical system 7 in accordance with the information from the signal processing unit 12 (information indicating the beam scanning angular speed $\omega$ and the beam scanning method) (step ST407). Thus, the beam scanning optical system 7 emits the transmission light sent from the turning back mirror 6 into a prescribed radiation direction in the atmosphere. Then, the beam scanning controller 8 sends the control information (the information indicating the radiation direction of the transmission light) to the rotation controller 92 of the optical axis corrector 9 and to the signal processing unit 12.

After that, the transmission light radiated to the atmosphere is scattered by scattering bodies such as aerosols in the atmosphere. Then, the beam scanning optical system 7 receives the scattered light as the received light. In the received light, a Doppler shift frequency corresponding to the wind speed occurs. The received light received by the beam scanning optical system 7 is output to the optical axis corrector 9 via the turning back mirror 6 and the transmission and reception separator 5.

Next, on the basis of the control information from the beam scanning controller 8 (the rotation angles $\gamma_1$ (t) and $\gamma_2$ (t) of the mirrors 71 and 72) and the information from the signal processing unit 12 (the information indicating the optical axis angular shift amount $\theta$), the rotation controller 92 of the optical axis corrector 9 calculates the optical axis shift direction $\psi$ according to Expression (6), and calculates the rotation angles $\Phi_1$ and $\Phi_2$ of the wedge prisms 91a and 91b according to Expressions (2) and (3) (steps ST408 and ST409). After that, on the basis of the calculation result, the rotation controller 92 carries out the rotation control of the two wedge prisms 91a and 91b simultaneously in a state in which the relative angular difference between the wedge prisms 91a and 91b (step ST410) is held. The received light corrected by the optical axis corrector 9 is output to the receiving side optical system 10.

After that, the receiving side optical system 10 shapes the received light from the optical axis corrector 9 into the light with the desired beam diameter and the desired angle of divergence. The received light shaped by the receiving side optical system 10 is output to the optical coupler 11.

After that, the optical coupler 11 couples the light (continuous light) from the optical splitter 2 with the received light from the receiving side optical system 10. The light coupled through the optical coupler 11 is output to the signal processing unit 12.

After that, the signal processing unit 12 carries out the heterodyne detection with respect to the light from the optical coupler 11, derives the frequency shift from the received signal, and calculates the wind speed in the radiation direction from the derived frequency shift on the basis of the control information from the beam scanning controller 8 (the information indicating the radiation direction of the transmission light).

In addition, as is seen from the fact that the rotation angles $\gamma_1$ (t) and $\gamma_2$ (t) of the mirrors 71 and 72 are the function of time with regard to the beam scanning, the rotation angles $\Phi_1$ and $\Phi_2$ of the wedge prisms 91a and 91b alter moment by moment. Accordingly, the optical axis corrector 9 acquires the control information ($\gamma_1$ (t) and $\gamma_2$ (t)) continually from the beam scanning controller 8 and repeats the rotation control of the wedge prisms 91a and 91b.

As described above, according to the present embodiment 1, the laser radar device is configured such that on the basis of the radiation direction of the transmission light, the beam scanning angular speed, and the wind measurement distance, the laser radar device corrects, with respect to the received light received by the beam scanning optical system 7, the optical axis angular shift which occurs between the transmission light and the received light through the implementation of the beam scanning. Thus, the laser radar device can correct the optical axis angular shift between the transmission light beam and the received light beam owing to the beam scanning and carry out the wind measurement without reducing the received signal intensity. Accordingly, the laser radar device enables distant wind measurement even in the case where the beam scanning angular speed is increased to raise the wind measurement rate, thereby being able to implement the long distance, high speed wind measurement. In addition, since the laser radar device can freely adjust the optical axis angular shift amount, the laser radar device can correct the optical axis for any beam scanning angular speed.

Incidentally, as for the foregoing optical axis corrector 9, the example in which the optical axis corrector 9 includes the two wedge prisms 91a and 91b is shown. However, this is not essential. For example, the optical axis corrector 9 can be set up by a reflecting optical system using two mirrors.

In addition, it is assumed in the foregoing example that the two wedge prisms 91a and 91b have the same refractive index. However, this is not essential. For example, the two wedge prisms 91a and 91b may be composed of a different refractive index material each.

In addition, FIG. 1 shows an example in which the optical axis corrector 9 is disposed between the transmission and reception separator 5 and the receiving side optical system 10. However, this is not essential. For example, the optical axis corrector 9 may be disposed between the transmitting side optical system 4 and the transmission and reception separator 5. On this occasion, the wedge prisms 91a and 91b are disposed in such a manner that their flat faces are perpendicular (including approximately perpendicular) to the optical axis of the transmission light serving as a reference, and the two flat faces are parallel (including approximately parallel).

In this case, in the same manner as the case where the optical axis corrector 9 is disposed between the transmission and reception separator 5 and the receiving side optical system 10, the optical axis corrector 9 calculates the relative angular difference between the two wedge prisms 91a and 91b according to Expressions (2), (4) and (5) to provide the two wedge prisms 91a and 91b with the relative angular difference. Then, in the beam scanning, the optical axis corrector 9 continually acquires the control information ($\gamma_1$ (t), $\gamma_2$ (t)) from the beam scanning controller 8, and causes the wedge prisms 91a and 91b to rotate. Providing the transmission light with the optical axis angular shift in this way can reduce the optical axis angular shift amount and the optical axis shift angle (denoted by $\theta$ and $\psi$ in FIG. 1) to zero, which occur in the receiving side optical system 10 when the optical axis corrector 9 is disposed between the transmission and reception separator 5 and the receiving side optical system 10, thereby eliminating the optical axis angular shift of the received light traveling toward the receiving side optical system 10.

On the other hand, when the optical axis corrector 9 is disposed between the transmitting side optical system 4 and the transmission and reception separator 5, the transmission light is provided with the optical axis angular shift and is radiated to the atmosphere as described above. However, regarding the beam scanning at 360 degrees, for example, the transmission light is radiated in the range of 360 degrees regardless of the presence or absence of the optical axis angular shift, so that there is no effect on the beam scanning.

In addition, during the beam scanning, it is also possible to alter the wind measurement distance L for correcting the optical axis angular shift between the transmission light beam and the received light beam. In this case, since the optical axis angular shift amount $\theta$ is altered according to Expression (1), the optical axis corrector 9 is required to alter the relative angular difference between the wedge prisms 91a and 91b when the wind measurement distance L is altered.

Embodiment 2

In the embodiment 1, a configuration is described in which the rotation system of the beam scanning optical system 7 and the rotation system of the optical axis corrector 9 are independent from each other. In contrast with this, in the embodiment 2, an example will be described in which the beam scanning optical system 7 includes the functions of the optical axis corrector 9, and the beam scanning optical system 7 corrects the optical axis angular shift by utilizing the rotation system used for the beam scanning.

Figure 5:
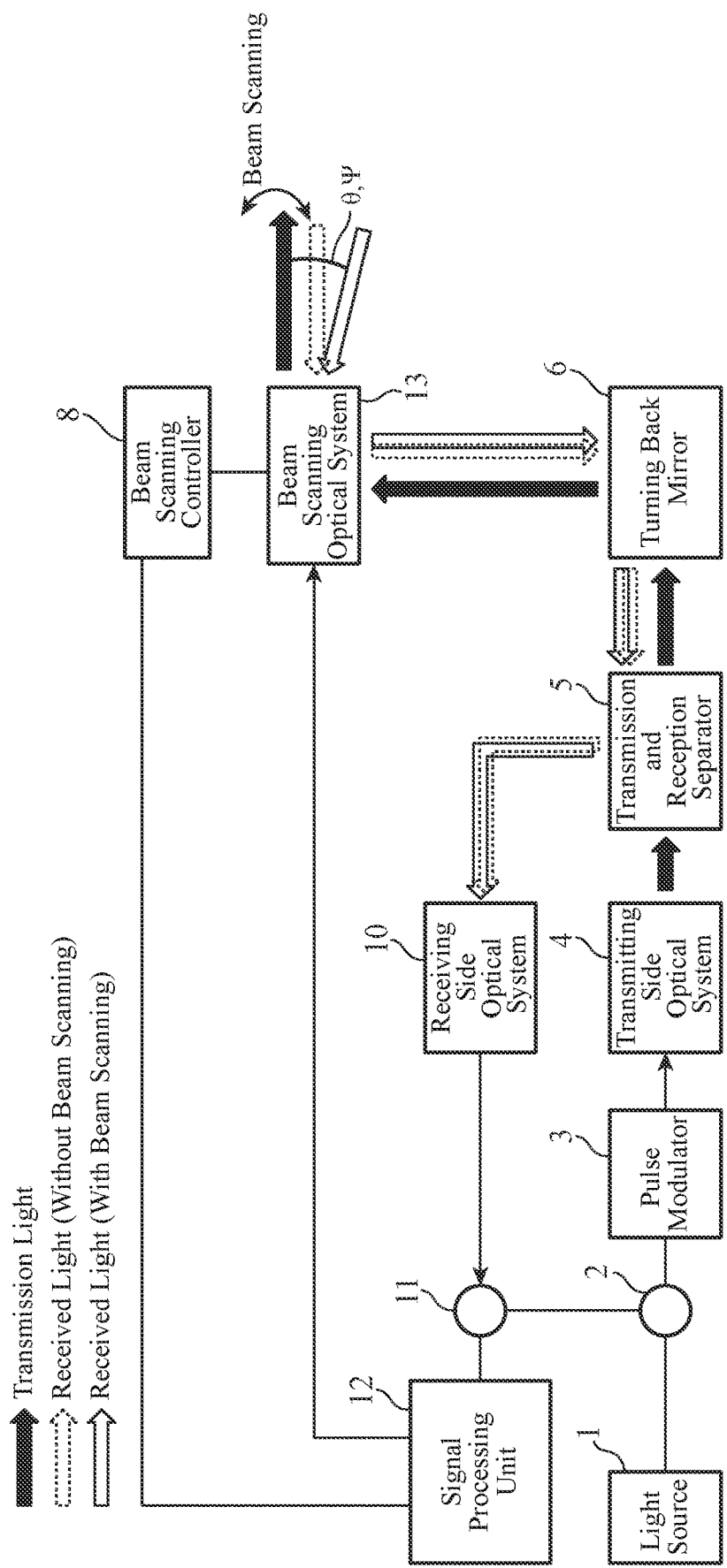
FIG. 5 is a block diagram showing a configuration of a laser radar device of an embodiment 2 in accordance with the present invention.

FIG. 5 is a block diagram showing a configuration of a laser radar device of the embodiment 2 in accordance with the present invention. The laser radar device of the embodiment 2 shown in FIG. 5 differs from the laser radar device of the embodiment 1 shown in FIG. 1 in that it excludes the optical axis corrector 9 and changes the beam scanning optical system 7 to the beam scanning optical system (beam scanner) 13 with an optical axis correction function. Since the remaining components are the same, they are designated by the same reference numerals and only the different portion will be described. Incidentally, the signal processing unit 12 sends the information indicating the optical axis angular shift amount to the beam scanning optical system 13 (to a rotation controller 1328 described later).

The beam scanning optical system 13 has, in addition to the functions of the beam scanning optical system 7 of the embodiment 1, a function of correcting the optical axis angular shift of the received light occurring between the transmission light beam and the received light beam owing to the beam scanning on the basis of the control information from the beam scanning controller 8 and the information from the signal processing unit 12 (information indicating the optical axis angular shift amount).

Next, a setup example of the beam scanning optical system 13 with the optical axis correction function will be described with reference to FIG. 6.

Figure 6:
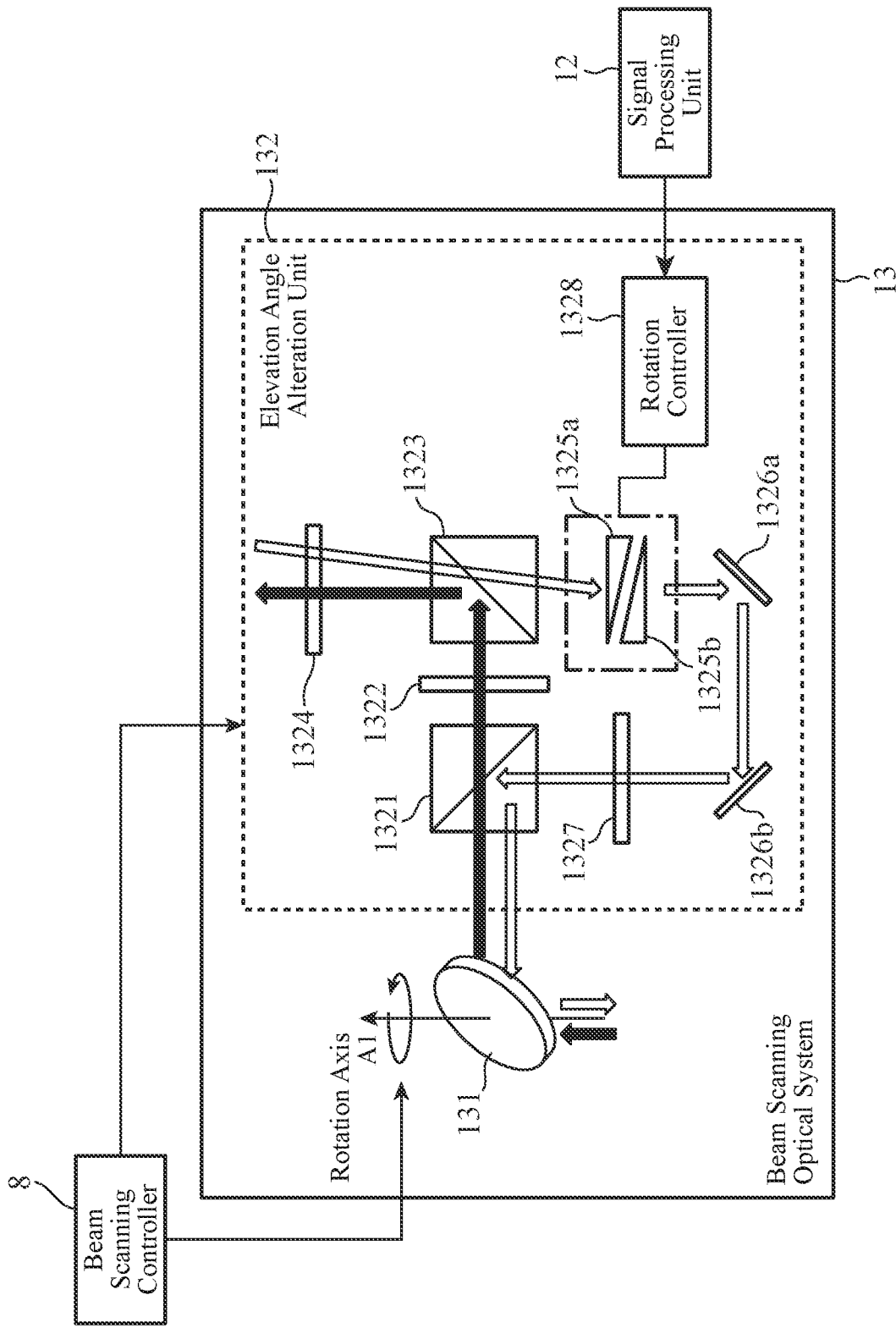
FIG. 6 is a diagram showing a configuration of a beam scanning optical system of the embodiment 2 in accordance with the present invention.

As shown in FIG. 6, the beam scanning optical system 13 is comprised of an azimuth alteration mirror 131 and an elevation angle alteration unit 132.

The azimuth alteration mirror 131 has a function of altering the azimuth of the radiation direction of the transmission light. More specifically, the azimuth alteration mirror 131 has an independent rotation axis A1, and rotates about the rotation axis A1 in accordance with the control by the beam scanning controller 8, thereby altering the azimuth. The azimuth alteration mirror 131 is set up on the optical axis of the transmission light.

The elevation angle alteration unit 132 has a function of altering the elevation angle of the radiation direction of the transmission light, and a function of correcting the optical axis angular shift of the received light, which occurs between the transmission light beam and the received light beam owing to the beam scanning, on the basis of the control information from the beam scanning controller 8 and the information (information indicating the optical axis angular shift amount) from the signal processing unit 12. The elevation angle alteration unit 132 is comprised of a polarization beam splitter 1321, a half-wave plate 1322, a polarization beam splitter 1323, a quarter-wave plate 1324, wedge prisms 1325a and 1325b, mirrors 1326a and 1326b, a half-wave plate 1327, and a rotation controller 1328.

The polarization beam splitter 1321 has a function of transferring the transmission light from the azimuth alteration mirror 131 and a function of reflecting the received light from the half-wave plate 1327. The polarization beam splitter 1321 is set up on the optical axis of the transmission light. The transmission light passing through the polarization beam splitter 1321 is output to the half-wave plate 1322, and the received light reflected is output to the azimuth alteration mirror 131.

The half-wave plate 1322 has a function of rotating the polarization direction of the transmission light from the polarization beam splitter 1321 by 90 degrees. The half-wave plate 1322 is set up on the optical axis of the transmission light. The transmission light whose polarization direction is rotated by 90 degrees through the half-wave plate 1322 is output to the polarization beam splitter 1323.

The polarization beam splitter 1323 has a function of reflecting the transmission light from the half-wave plate 1322 and transferring the received light from the quarter-wave plate 1324. The polarization beam splitter 1323 is set up on the optical axis of the transmission light. The transmission light reflected by the polarization beam splitter 1323 is output to the quarter-wave plate 1324, and the received light transferred is output to the wedge prisms 1325a and 1325b.

The quarter-wave plate 1324 has a function of emitting the transmission light from the polarization beam splitter 1323 into the atmosphere, and a function of receiving the scattered light from the atmosphere as the received light. The quarter-wave plate 1324 is set up on the optical axis of the transmission light. The received light received by the quarter-wave plate 1324 is output to the polarization beam splitter 1323.

As for the received light from the polarization beam splitter 1323, the wedge prisms 1325a and 1325b have a function of correcting the optical axis angular shift occurring between the transmission light beam and the received light beam owing to the beam scanning. The wedge prisms 1325a and 1325b are set up in such a manner that their flat faces become perpendicular (including approximately perpendicular) to the optical axis of the reference received light, and the two flat faces are parallel (including approximately parallel) to each other. The received light corrected with the wedge prisms 1325a and 1325b is output to the mirror 1326a.

The mirrors 1326a and 1326b have a function of reflecting the received light from the wedge prisms 1325a and 1325b and sending the received light to the half-wave plate 1327. The mirrors 1326a and 1326b are set up on the optical axis of the received light.

The half-wave plate 1327 has a function of rotating the polarization direction of the received light from the mirrors 1326a and 1326b by 90 degrees. The half-wave plate 1327 is set up on the optical axis of the received light. The received light whose polarization direction is rotated by 90 degrees through the half-wave plate 1327 is output to the polarization beam splitter 1321.

The rotation controller 1328 has a function of calculating the rotation angles of the wedge prism 1325a and the wedge prism 1325b on the basis of the control information from the beam scanning controller 8 and the information from the signal processing unit 12 (information indicating the optical axis angular shift amount), and a function of carrying out the rotation control of the wedge prism 1325a and the wedge prism 1325b independently in accordance with the rotation angles calculated. The rotation controller 1328 is implemented by program processing based on software with the CPU.

Incidentally, all the components of the elevation angle alteration unit 132 enclosed by the broken lines in FIG. 6 have a common rotation axis and rotate simultaneously about the rotation axis which is the optical axis of the transmission light reflected by the azimuth alteration mirror 131 (black arrow in FIG. 6). This enables altering the elevation angle direction with regard to the radiation direction of the transmission light. The rotation axis is the same axis as the rotation axis A2 in FIG. 2. As a setup for simultaneously rotating all the components of the elevation angle alteration unit 132 about the common rotation axis, for example, all the components are arranged on a single board.

Next, the operation of the beam scanning optical system 13 with the optical axis correction function will be described with reference to FIG. 7.

First, the signal processing unit 12 sends the information indicating the optical axis angular shift amount $\theta$ to the rotation controller 1328 of the beam scanning optical system 13. The optical axis angular shift amount $\theta$ is obtained according to Expression (1) in the same manner as the embodiment 1.

After that, on the basis of the optical axis angular shift amount $\theta$ and the control information from the beam scanning controller 8 (the rotation angles $\gamma_1(t)$ and $\gamma_2(t)$ of the azimuth alteration mirror 131 and the elevation angle alteration unit 132), the rotation controller 1328 of the beam scanning optical system 13 determines the rotation angles of the wedge prisms 1325a and 1325b.

Here, the rotation angles $\Phi_1$ and $\Phi_2$ of the wedge prisms 1325a and 1325b are obtained by the following Expressions (7)-(9):

$$\Phi_1 = \Phi_2 + \sigma \quad (7)$$

$$\Phi_2 = \tan^{-1}(\tan \xi (\cos \sigma + 1) - \sin \sigma)/(\cos \sigma + 1 + \sin \sigma \tan \xi) \quad (8)$$

$$\sigma = \cos^{-1}(\theta^2 - 2\delta^2)/2\delta^2 \quad (9)$$

Incidentally, δ is a variable given by Expression (5). In addition, it is assumed in Expressions (7)-(9) that the refractive indices of the wedge prisms 1325*a* and 1325*b* are equal.

In addition, the optical axis shift direction ξ is a variable determined by the rotation angles $\gamma_1$ (t) and $\gamma_2$ (t) of the azimuth alteration mirror 131 and the elevation angle alteration unit 132, and represents the optical axis shift direction of the received light incident on the wedge prisms 1325*a* and 1325*b* from the polarization beam splitter 1323.

The optical axis shift direction ξ is obtained by the following Expression (10):

$$\xi = (\gamma_1(t), \gamma_2(t)) \tag{10}$$

Here, the embodiment 2 is different from the embodiment 1 in that since the optical axis shift direction ξ becomes a constant with conditions attached, the necessity of the rotation control of the wedge prisms 1325*a* and 1325*b*, which follows the changes in the beam scanning direction as described in the embodiment 1, is eliminated.

As for the conditions for fixing the optical axis shift direction ξ, for example, in a case where the azimuth alteration mirror 131 is rotated about the rotation axis A1, the conditions are satisfied when the rotation direction is limited to one direction. In addition, in a case where the rotation of the azimuth alteration mirror 131 is fixed and the elevation angle alteration unit 132 is rotated only in one direction restrictedly, the foregoing conditions are satisfied.

On the other hand, when the forward transfer and reverse transfer are switched in the beam scanning process, the rotation angles of the wedge prisms 1325*a* and 1325*b* must be each reversed 180 degrees at the switching.

Thus, the rotation controller 1328 calculates ξ, first, and then calculates the rotation angles $\Phi_1$ and $\Phi_2$ of the wedge prisms 1325*a* and 1325*b*. Then, on the basis of the result, the rotation controller 1328 carries out the rotation control of the wedge prisms 1325*a* and 1325*b*.

Next, the overall operation of the laser radar device of the embodiment 2 will be described with reference to FIG. 8. The overall operation of the laser radar device of the present embodiment 2 is basically the same as the overall operation of the embodiment 1 shown in FIG. 4. However, in the case of the beam scanning method in which the optical axis shift direction ξ satisfies certain conditions, it is not necessary to carry out the rotation control of the wedge prisms 1325*a* and 1325*b* while successively acquiring the information about the rotation angles $\gamma_1$ (t) and $\gamma_2$ (t) of the azimuth alteration mirror 131 and elevation angle alteration unit 132.

In the overall operation of the laser radar device, before starting the beam scanning, the signal processing unit 12 sets, as initial values, the beam scanning angular speed ω and the wind measurement distance L for correcting the optical axis angular shift between the transmission light beam and the received light beam, first, as shown in FIG. 8 (steps ST801 and ST802). Then, the signal processing unit 12 calculates the optical axis angular shift amount θ from the beam scanning angular speed ω and the wind measurement distance L (step ST803). The information indicating the optical axis angular shift amount θ is sent to the beam scanning optical system 13. Incidentally, it may be configured such that the signal processing unit 12 sets the beam scanning angle ω and the wind measurement distance L, and the rotation controller 1328 of the beam scanning optical system 13 calculates the optical axis angular shift amount θ.

Furthermore, the signal processing unit 12 sends the information indicating the beam scanning angular speed ω and a beam scanning method (rotation control method of the azimuth alteration mirror 131 and elevation angle alteration unit 132) to the beam scanning controller 8.

After that, the rotation controller 1328 of the beam scanning optical system 13 calculates the relative angular difference between the wedge prisms 1325*a* and 1325*b* according to Expressions (7), (9) and (5) on the basis of the information from the signal processing unit 12 (information indicating the optical axis angular shift amount) (step ST804). Then, on the basis of calculation result, the rotation controller 1328 provides the wedge prisms 1325*a* and 1325*b* with the relative angular difference (step ST805). This makes it possible to correct the optical axis angular shift amount θ. Incidentally, in the process of the beam scanning, as long as the beam scanning angular speed ω and the wind measurement distance L for correcting the optical axis angular shift between the transmission light beam and the received light beam are fixed, the angular difference is also fixed continually.

After that, the wind measurement is started (step ST806). More specifically, the light source 1 generates the light (continuous light) with a single wavelength, and the optical splitter 2 divides the light into two parts. A first part divided by the optical splitter 2 is output to the pulse modulator 3, and a second part is output to the optical coupler 11.

Next, the pulse modulator 3 carries out the pulse modulation of the light sent from the optical splitter 2 and gives a desired frequency shift to the light. The light modulated by the pulse modulator 3 is output to the transmitting side optical system 4 as the transmission light.

Next, the transmitting side optical system 4 shapes the transmission light from the pulse modulator 3 into light with a desired beam diameter and a desired angle of divergence. The transmission light shaped by the transmitting side optical system 4 is output to the beam scanning optical system 13 via the transmission and reception separator 5 and the turning back mirror 6.

After that, the beam scanning controller 8 controls the radiation direction of the beam scanning optical system 13 in accordance with the information from the signal processing unit 12 (the beam scanning angular speed and the information indicating the beam scanning method ($\gamma_1$ (t) and $\gamma_2$ (t))) (step ST807). Thus, the beam scanning optical system 13 radiates the transmission light sent from the turning back mirror 6 into a prescribed radiation direction in the atmosphere. Then, the beam scanning controller 8 sends the control information (the information indicating the radiation direction of the transmission light) to the signal processing unit 12 and the rotation controller 1328 of the beam scanning optical system 13.

After that, on the basis of the control information from the beam scanning controller 8 and the information from the signal processing unit 12 (information indicating the optical axis angular shift amount), the rotation controller 1328 of the beam scanning optical system 13 calculates the optical axis shift direction ξ according to Expression (10) and calculates the rotation angles $\Phi_1$ and $\Phi_2$ of the wedge prisms 1325*a* and 1325*b* according to Expressions (7) and (8) (steps ST808 and 809). After that, on the basis of the calculation result, the rotation controller 1328 carries out the rotation control of the two wedge prisms 1325*a* and 1325*b* simultaneously in the state of maintaining the relative angular difference of the wedge prisms 1325*a* and 1325*b* (step ST810).

After that, the transmission light radiated to the atmosphere is scattered by scattering bodies such as aerosols in the atmosphere. Then, the beam scanning optical system 13 receives the scattered light as the received light. In the received light, a Doppler shift frequency corresponding to the wind speed occurs. The received light received by the beam scanning optical system 13 is output to the receiving side optical system 10 via the turning back mirror 6 and the transmission and reception separator 5.

After that, the receiving side optical system 10 shapes the received light from the transmission and reception separator 5 into the light with the desired beam diameter and the desired angle of divergence. The received light shaped by the receiving side optical system 10 is output to the optical coupler 11.

After that, the optical coupler 11 couples the light (continuous light) from the optical splitter 2 with the received light from the receiving side optical system 10. The light coupled through the optical coupler 11 is output to the signal processing unit 12.

After that, the signal processing unit 12 carries out the heterodyne detection with respect to the light from the optical coupler 11, derives the frequency shift from the received signal, and calculates the wind speed from the derived frequency shift on the basis of the control information from the beam scanning controller 8.

Incidentally, the wedge prisms 1325a and 1325b are fixed after the rotation control, and the rotation control of the wedge prisms 1325a and 1325b is not performed during the beam scanning.

As described above, according to the present embodiment 2, it is configured in such a manner as to integrate the optical axis corrector 9 into the beam scanning optical system 7 and correct the optical axis angular shift by utilizing the rotation system employed for the beam scanning in the beam scanning optical system 7. Accordingly, in addition to the advantages of the embodiment 1, the present embodiment 2 makes it unnecessary to carry out the synchronous rotation control of the wedge prisms 1325a and 1325b following the changes in the azimuth and elevation angles of the transmission light radiation direction through the implementation of the beam scanning. As a result, the number of components can be reduced, and the load of the signal processing can be alleviated.

Incidentally, as for the foregoing beam scanning optical system 13, the example in which the beam scanning optical system 13 includes the two wedge prisms 1325a and 1325b is shown. However, this is not essential. For example, the beam scanning optical system 13 can be set up by a reflecting optical system using two mirrors.

In addition, although the foregoing embodiment represents the example in which the optical axis correction function is added to the elevation angle alteration mirror 72 of the embodiment 1, the optical axis correction function may be added to the azimuth alteration mirror 71.

In addition, FIG. 6 illustrates the example in which the wedge prisms 1325a and 1325b for canceling the optical axis angular shift are disposed between the polarization beam splitter 1323 and the mirror 1326a. However, this is not essential. For example, the wedge prisms 1325a and 1325b may be disposed between the half-wave plate 1322 and the polarization beam splitter 1323 or between the polarization beam splitter 1321 and the half-wave plate 1322. On this occasion, the wedge prisms 1325a and 1325b are set up in such a manner that their flat faces become perpendicular (including approximately perpendicular) to the optical axis of the reference transmission light and the two flat faces become parallel (including approximately parallel) to each other.

In this case, as is the same case with the wedge prisms 1325a and 1325b disposed between the polarization beam splitter 1323 and the mirror 1326a, the rotation controller 1328 of the beam scanning optical system 13 calculates the relative angular difference between the two wedge prisms 1325a and 1325b according to Expressions (7), (9) and (5) to provide the wedge prisms 1325a and 1325b with the relative angular difference. Then, the rotation controller 1328 calculates the rotation angles of the two wedge prisms 1325a and 1325b according to Expression (10) and carries out the rotation control. In the embodiment 2, as long as the foregoing conditions for fixing the optical axis shift direction $\xi$ are satisfied, the rotation control of the wedge prisms 1325a and 1325b in accordance with the beam scanning is eliminated by maintaining the rotation angles. Providing the transmission light with the optical axis angular shift in this way can reduce the optical axis angular shift amount and the optical axis shift angle ($\theta$ and $\xi$ shown in FIG. 5) to zero, which occur in the received light shown in FIG. 5, thereby eliminating the optical axis angular shift of the received light traveling toward the receiving side optical system 10.

On the other hand, when the wedge prisms 1325a and 1325b are disposed on the transmitting side, the transmission light is provided with the optical axis angular shift and is radiated to the atmosphere as described above. However, in the beam scanning around 360 degrees, for example, since the transmission light is radiated in the range of 360 degrees regardless of the optical axis angular shift, there is no effect on the beam scanning.

In addition, the wind measurement distance L for correcting the optical axis angular shift between the transmission light beam and the received light beam may be altered during the beam scanning. In this case, since the optical axis angular shift amount $\theta$ alters according to Expression (1), it is necessary for the rotation controller 1328 to alter the relative angular difference between the wedge prisms 1325a and 1325b when the wind measurement distance L is altered.

Incidentally, it is to be understood that a free combination of the individual embodiments, variations of any components of the individual embodiments or removal of any components of the individual embodiments is possible within the scope of the present invention.

INDUSTRIAL APPLICABILITY

A laser radar device in accordance with the present invention is capable of correcting the optical axis angular shift between the transmission light beam and the received light beam owing to the beam scanning, thereby being able to prevent the reduction in the received signal intensity. Accordingly, the laser radar device is suitable for the application to the wind measurement or the like.

REFERENCE SIGNS LIST

1 light source; 2 optical splitter; 3 pulse modulator (modulator); 4 transmitting side optical system; 5 transmission and reception separator; 6 turning back mirror; 7 beam scanning optical system (beam scanner); 8 beam scanning controller; 9 optical axis corrector; 10 receiving side optical system; 11 optical coupler; 12 signal processing unit; 13 beam scanning optical system (beam scanner); 71 azimuth alteration mirror; 72 elevation angle alteration mirror; 91a, 91b wedge prism; 92 rotation controller; 131 azimuth alteration mirror; 132 elevation angle alteration unit; 1321 polarization beam splitter; 1322 half-wave plate; 1323 polarization beam splitter; 1324 quarter-wave plate; 1325a,

1325b wedge prism; 1326a, 1326b mirror; 1327 half-wave plate; 1328 rotation controller.

The invention claimed is:

1. A laser radar device comprising:
a light source to generate light with a single wavelength;
a modulator to modulate the light generated by the light source into transmission light;
a beam scanner to carry out beam scanning by which the transmission light modulated by the modulator is radiated, the radiated light reflected from a plurality of scattering bodies, and the light reflected is received as received light;
a beam scanning controller to control a radiation direction of the beam scanner;
a signal processor to carry out wind measurement by performing heterodyne detection by using the light generated by the light source and the corresponding received light received by the beam scanner; and
an optical axis corrector to successively correct an optical axis angular shift occurring between the transmission light and the received light which vary with time owing to the beam scanning, the correction being with respect to the received light used by the signal processor or the transmission light used by the beam scanner, on a basis of information indicating the radiation direction of the transmission light in the beam scanner, the information being successively received from the beam scanning controller, and on a basis of an angular speed of the beam scanning and a wind measurement distance, wherein the optical axis corrector comprises:
two wedge prisms with their flat faces being disposed perpendicularly to a reference optical axis; and
a rotation controller to correct the optical axis angular shift by carrying out simultaneous rotation control of the two wedge prisms in a manner as to follow change of the information indicating the radiation direction of the transmission light from the beam scanner, the information being successively received from the beam scanning controller, in a state in which the two wedge prisms are provided with a relative angular difference on the basis of the angular speed of the beam scanning and a specified wind measurement distance used for correcting the optical axis angular shift, the angular difference being maintained.

2. The laser radar device according to claim 1, wherein the optical axis corrector is incorporated into the beam scanner, and corrects the optical axis angular shift by using a rotation system used for the beam scanning with the beam scanner.

3. The laser radar device according to claim 1, wherein the two wedge prisms are disposed with their flat faces being disposed perpendicularly to an optical axis of either the transmission light or the received light.

* * * * *